United States Patent
Mecca

(10) Patent No.: US 12,153,552 B1
(45) Date of Patent: Nov. 26, 2024

(54) SYSTEMS AND METHODS FOR GENERATING A SYNTHESIZED DATABASE

(71) Applicant: PortPro Technologies, Inc., Jersey City, NJ (US)

(72) Inventor: Michael Mecca, Jersey City, NJ (US)

(73) Assignee: PortPro Technologies, Inc., Jersey City, NJ (US)

( * ) Notice: Subject to any disclaimer, the term of this patent is extended or adjusted under 35 U.S.C. 154(b) by 0 days.

(21) Appl. No.: 18/584,304

(22) Filed: Feb. 22, 2024

(51) Int. Cl.
*G06F 16/21* (2019.01)

(52) U.S. Cl.
CPC ................... *G06F 16/21* (2019.01)

(58) Field of Classification Search
CPC ........................................ G06F 16/21
USPC ........................................ 707/804
See application file for complete search history.

(56) References Cited

U.S. PATENT DOCUMENTS

| | | | |
|---|---|---|---|
| 10,769,577 | B2 | 9/2020 | Subramanian |
| 11,157,864 | B2 * | 10/2021 | Kang ................ G06Q 10/0833 |
| 11,250,015 | B2 * | 2/2022 | Kadel ................... G06F 3/0482 |
| 11,526,258 | B1 * | 12/2022 | Starnes ............... G06F 3/04817 |
| 2002/0194502 | A1 * | 12/2002 | Sheth .................... G06F 16/954 726/4 |
| 2004/0167825 | A1 | 8/2004 | Nadan |
| 2009/0125350 | A1 * | 5/2009 | Lessing ................. G06Q 10/08 705/7.12 |
| 2019/0129996 | A1 * | 5/2019 | Chapman ................ G06F 16/25 |
| 2020/0302388 | A1 * | 9/2020 | Merle ................ G06Q 10/0833 |
| 2021/0064501 | A1 * | 3/2021 | Nam ...................... G06F 16/258 |

FOREIGN PATENT DOCUMENTS

WO    WO 01/46884 A2 *    6/2001    ............. G06F 17/60

OTHER PUBLICATIONS

Hansen, Mark, et al., "Process Aggregation Using Web Services", WES 2002, Lecture Notes in Computer Science, vol. 2512, © 2002, Springer-Verlag, Berlin, Germany, pp. 12-27.*
"BlueCargo—The market leading solution for Detention & Demurrage mitigation," webpage <https://www.bluecargo.io/>, 4 pages, retrieved on Oct. 23, 2023.

* cited by examiner

*Primary Examiner* — Robert Stevens
(74) *Attorney, Agent, or Firm* — Caldwell Intellectual Property Law

(57) ABSTRACT

A system and methods for generating a synthesized database. The system comprises at least a processor and a memory to receive a unified display subject, identify a plurality of data structures relevant to the unified display subject, aggregate, the plurality of data structures, generate a synthesized database from the plurality of data structures, detect a data structure change, receive the detected data structure change, modify the synthesized database based on the detected data structure change, and display the modified synthesized database at a client device, wherein the remote device is in communication with the processor.

20 Claims, 10 Drawing Sheets

New Load

| Manually | Automatically |

**\*Load Type**
● Import   ○ Export   ○ Road   ○ Bill Only

**\*Customer**
[                    ⌄]

**\*Port**
[                    ⌄]

**\*Consignee**
[                    ⌄]

**\*Terminal**

Container Number

Vessel ETA      Container Size      Master Bill of Lading
Last Free Day   Container Type      Seal #
Outgate Date    Container Owner     Vessel Name
Ingate Date     Customer Hold       Voyage
                Fright Hold
                Broker Hold Automatically Pulls 13 New Data Fields 

**\*Select Route for this load**
○ Pick and Run + Drop & Hook
● Pick and Run + Live Unload
○ Prepull + Drop & Hook
○ Prepull + Live Unload

Container Free Day

Owner    Type    Size    [Free Day]

Select Customer [ MSC ]

| Customer | Owner | Type | Tier #0 | Tier #1 | Tier #2 | Holiday | First Weekend | First Day | | |
|---|---|---|---|---|---|---|---|---|---|---|
| ALL | MSC | REEFER | 1-5 days $225 | 6-11 days $275 | 12-10000 days $425 | Yes | Yes | - 7 + | ✎ Save | 🗑 |
| ALL | MSC | ST | 1-5 days $225 | 6-11 days $275 | 12-10000 days $425 | Yes | Yes | - 7 + | ✎ Save | 🗑 |
| ALL | MSC | HC | 1-5 days $225 | 6-11 days $275 | 12-10000 days $425 | Yes | Yes | - 7 + | ✎ Save | 🗑 |

FIG. 5D

SYSTEMS AND METHODS FOR GENERATING A SYNTHESIZED DATABASE

FIELD OF THE INVENTION

The present invention generally relates to the field of data integration and web technologies for logistics and supply chain management. In particular, the present invention is directed to a system for generating a synthesized database.

BACKGROUND

The field of logistics and supply chain management is increasingly reliant on the efficient and accurate exchange of information. One of the critical aspects of this field is the management of intermodal terminals, which are pivotal nodes in the global supply chain network. These terminals serve as transfer points where goods are moved from one mode of transport to another, for instance, from ship to rail, or rail to truck. The effectiveness of these terminals significantly impacts the efficiency of the entire supply chain. In the realm of intermodal terminal operations, a crucial aspect is the scheduling and managing of appointments for container handling, which involves the coordination of numerous containers, each with varying destinations, sizes, and contents. The complexity of this task is compounded by the need to track and manage these containers across multiple geographic locations and terminal systems, each potentially having its own scheduling software and operational protocols.

Furthermore, there exists a challenge in handling per diem charges associated with containers. Per diem charges are levied when containers are held beyond a pre-agreed duration, known as "free time." Efficient tracking and management of these charges are vital to avoid unnecessary expenses and optimize the use of containers. However, current systems often struggle with the centralized aggregation of this information, leading to inefficiencies and errors in charge management. Additionally, the field faces challenges in aggregating and updating information from diverse sources to create a unified and current view of operations. This is particularly true for synthesized database that need to collate data from multiple remote database provided by different third-party sources. The conventional methods of data aggregation and web page synthesis often result in delays and inaccuracies due to the reliance on manual processes and the sheer volume of data involved. Moreover, the dynamic nature of logistics operations necessitates constant monitoring and generating the synthesized database to reflect the most current data, a process that is cumbersome and time-consuming. These challenges highlight a pressing need for an improved method and system in logistics and supply chain management, particularly in the context of intermodal terminal operations and synthesized web page generation from multiple remote sources.

SUMMARY OF THE DISCLOSURE

In an aspect, a system for generating a synthesized database, wherein the system comprises at least a processor and a memory communicatively connected to the at least a processor, wherein the memory containing instruction configuring the at least a processor to receive a unified display subject, identify, at a plurality of remote web pages provided at a plurality of third-party sources, a plurality of data structures relevant to the unified display subject, aggregate, at a local server, the plurality of data structures, generate, at the local server, a synthesized web page from the plurality of data structures, detect, at one remote web page of the plurality of remote web pages, a data structure change, receive, from the remote web page, the detected data structure change, modify the synthesized web page based on the detected data structure change and display the modified synthesized web page at a client device.

In another aspect, a method for generating a synthesized database, wherein the method comprises receiving, using at least a processor, a unified display subject, identifying, using the at least a processor, at a plurality of remote web pages provided at a plurality of third-party sources, a plurality of data structures relevant to the unified display subject, aggregating, using the at least a processor, at a local server, the plurality of data structures, generating, using the at least a processor, at the local server, a synthesized web page from the plurality of data structures, detecting, using the at least a processor, at one remote web page of the plurality of remote web pages, a data structure change, receiving, using the at least a processor, from the remote web page, the detected data structure change, modifying, using the at least a processor, the synthesized web page based on the detected data structure change and displaying, using the at least a processor, the modified synthesized web page at a remote device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 5A is a diagram of a user interface for displaying load information;

FIG. 5B is a diagram of a user interface for dispatcher information with customer information;

FIG. 5C is a diagram of a user interface for dispatcher information with customer information;

FIG. 5D is a diagram of a user interface for pre diem audit report;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating a synthesized database. In an embodiment, system is designed to streamline the process of managing and disputing per diem charges associated with container logistics by providing a unified platform for tracking, reporting, and analyzing data.

Aspects of the present disclosure can be used to enhance operational efficiency for logistics companies by consolidating critical data into a central user interface. Aspects of the present disclosure can also be used to provide real-time updates on container status, appointment schedules, and terminal charges, thereby enabling proactive management and dispute of fees. This is so, at least in part, because system employs sophisticated algorithms and machine learning techniques to process vast amounts of data from various sources, ensuring that users receive accurate and actionable information.

Aspects of the present disclosure allow for improvements in resource allocation and cost management for shipping and logistics operations. Exemplary embodiments illustrating aspects of the present disclosure are described below in the context of several specific examples.

Figure 1:
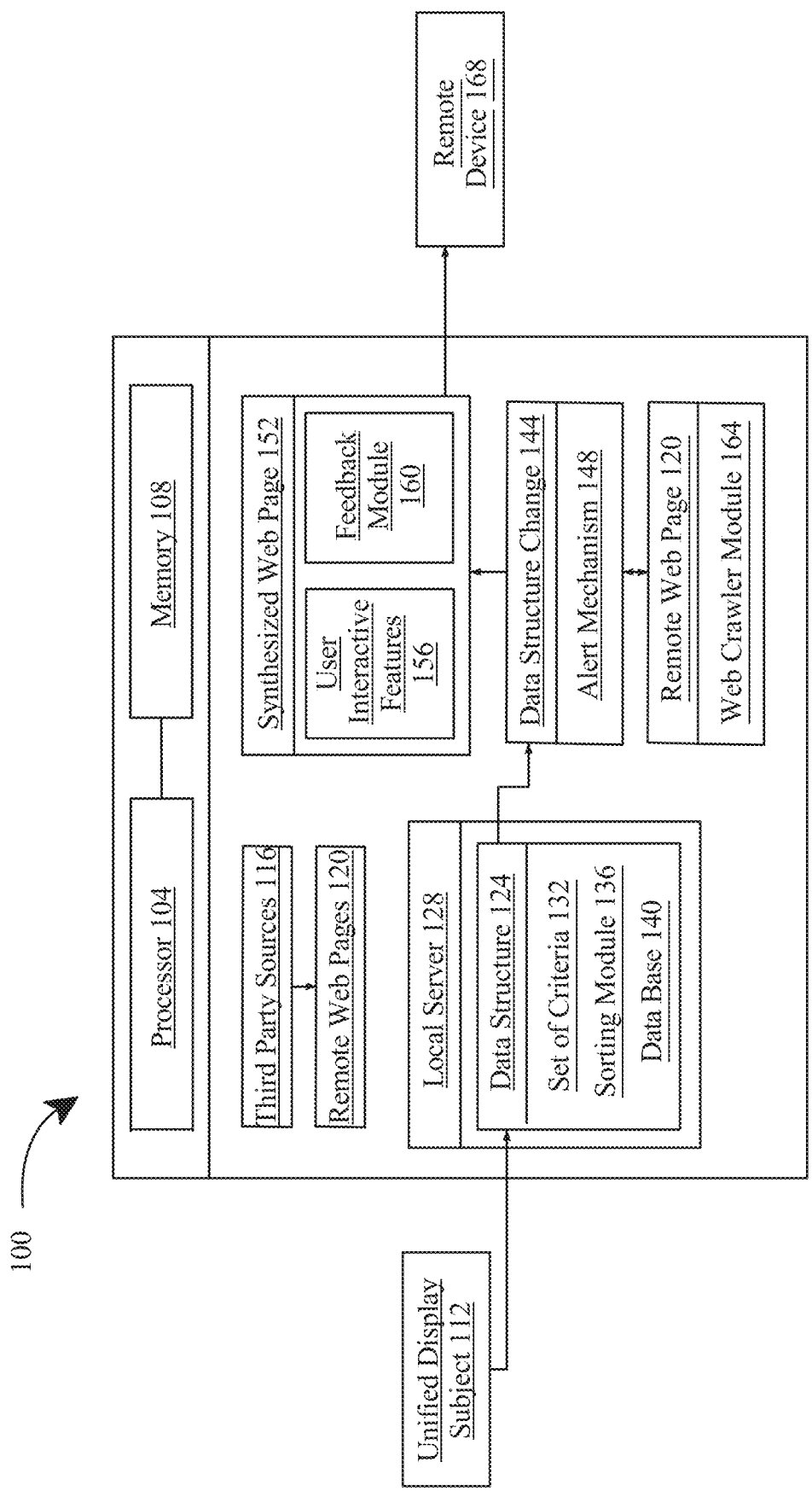
FIG. 1 is a block diagram of an exemplary system for generating a synthesized database is described.

Referring now to FIG. 1, an exemplary embodiment of a system 100 for generating a synthesized database is illustrated. System includes a computing device. Computing device includes a processor communicatively connected to a memory. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. In some cases, data and/or signals may be used through API integration and the like. API integration refers to the process of connecting different software systems through their application programming interfaces (APIs) to allow them to communicate and work together as described further below. APIs define the methods and data formats that applications can use to request and exchange information. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Further referring to FIG. 1, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices (e.g., APIs and/or web scraping), and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a non-limiting example, using a "shared nothing" architecture.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, a system 100 includes a memory 108 communicatively connected to at least a processor 104. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, system 100 and/or computing device may perform determinations, classification, and/or analysis steps, methods, processes, or the like as described in this disclosure using machine learning processes. A "machine learning process," as used in this disclosure, is a process that automatedly uses a body of data known as "training data" and/or a "training set" (described further below) to generate an algorithm that will be performed by a computing device/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below.

Still referring to FIG. 1, system 100 for generating a synthesized web page 152 from remote sources comprises at least one processor and a memory 108 communicatively connected to the at least a processor, wherein the memory 108 containing instructions configuring the at least processor to receive a unified display subject 112. As used in this disclosure, a "unified display subject" is a specific topic, theme, or area of interest around which the aggregated content from various remote web pages 120 is organized and displayed on the synthesized web page 152, ensuring coherence and relevance of the information presented to the user. Initially, processor 104 may receive user input or a predefined command, activate a set of programmed instructions stored in the connected memory 108. Instructions may be designed to define and recognize the unified display subject 112. Recognition process may involve analyzing input criteria such as keywords relevant to the logistics industry, themes such as transportation schedules, maintenance periods, and operational efficiency, user preferences set by system administrators or end-users, or specific data tags that align with the logistical workflow, such as container identifiers, shipping routes, or terminal codes. The aggregation and display mechanism may be designed to compile and present the logistics information pertinent to the unified display subject 112. For instance, unified display subject 112 may be set to 'container logistics,' system may aggregate data such as container locations, estimated arrival times, per diem charges, and customs clearance statuses. Unified display subject 112 may then display information in an integrated dashboard that provides a real-time overview of container movements, potential bottlenecks in the supply chain, and actionable items for logistics personnel. The data displayed as part of unified display subject 112 may be dynamically updated to reflect the most current and relevant information. System 100 may be capable of accessing real-time data feeds from port operations, GPS tracking systems, and customer databases to ensure that the information presented is up-to-date and accurate, thus enabling users to make informed decisions based on the latest available data. Moreover, user interface may be customized to reflect the specific informational needs of different users. For example, a dispatcher may see a detailed view of container statuses and scheduling options, while a logistics manager may have access to a broader overview that includes financial metrics and performance (key performance indicators) KPIs. Processor 104 may employ advanced algorithms, such as natural language processing (NLP) and machine learning techniques, to accurately interpret and confirm unified display subject 112 from the input. Once identified, processor 104 may initiate a series of subsequent operations, such as data fetching and aggregation, based on unified display subject 112. Operations may be optimized for efficiency and accuracy, leveraging processor 104's computational capabilities to handle the complex task of synthesizing relevant and coherent information from multiple disparate data sources into a single, unified web page display. In an embodiment, an appointment data may be received associated with a plurality of containers from one or more intermodal terminals. As described in this disclosure, "intermodal terminals" is a facility that may be responsible for the transfer of freight from one mode of transfer to another. For example, intermodal terminal may be responsible for the transfer of a cargo container from a ship to a truck. Intermodal terminals may contain the proper infrastructure to facilitate the transition between various modes of transport such as but not limited to, from rail to road, from sea to road and the like. For instance, an intermodal terminal may handle the unloading of cargo containers from a ship and prepare them for pickup by a ground transport carrier, such as a truck. Intermodal terminals may be equipped with the necessary infrastructure to offload containers from ships and stage them for subsequent pickup, may include the provision of appointment times for cargo collection, scheduling and managing these appointments falls on the carriers or truckers. Carrier may engage with the terminal's appointment system, reserve a time slot that aligns with their transport schedule, may arrive at the terminal within the designated window, and then execute the physical pickup of the container. Intermodal terminals may offer a range of services to streamline this process, for example, real-time appointment scheduling systems, status updates on container readiness, and infrastructure support for quick and efficient cargo transfers. These services may maintain the flow of goods and minimize delays, as they allow carriers to plan their pickups and drop-offs around the availability of the cargo and terminal operations. Furthermore, intermodal terminals appointment systems may be designed to accommodate the complexities of logistics coordination. Intermodal terminals may account for factors such as the specific requirements of different cargo types, peak operation times, and resource availability. This may ensure that carriers are provided with accurate and timely information to schedule their operations effectively. As used in this disclosure, "appointment data" is the appointment scheduling of each intermodal terminal. Appointment scheduling helps optimize the loading and unloading of containers and/or other equipment. Generally, carriers, drivers, shipping companies, and the like much schedule appointments and book specific time slots that may be used to pick up or drop off containers. Scheduling of appointments may ensure the proper resources and personnel are present when a carrier desires to load or unload a cargo container. Appointment data may include any available appointments of the intermodal terminal. Appointment data may further include any information associated with the containers that will be picked up or dropped off. Appointment data may be part of logistics management system, encapsulates a comprehensive set of information pertaining to the containers managed within an intermodal terminal. To encompass the full breadth of details required for efficient container tracking and handling, appointment data may be expanded to include additional elements as specified by the client's comment. In a non-limiting example, appointment data may include information associated with shipping containers such as the size of the shipping containers, anticipated return time, designated return locations, various charges, the ownership details of the containers and the like. Furthermore, the exact positioning of the container within the terminal yard may be recorded in appointment data. Location detail may enable carriers to locate the containers upon arrival at the terminal, expediting the pickup process. System 100 may facilitate this by integrating with yard management systems to provide real-time updates on container placement, movement within the yard, and changes in the storage location due to operational requirements or container readiness. In a non-limiting example, a carrier may schedule an appointment for container pickup, appointment data presented would include the container's identifying number, the owner's details, the specific area or zone within the terminal where the container is stationed, and any relevant movement orders that may affect the pickup process. Additionally, if the container incurs per diem charges, these charges would be itemized in appointment data, along with any other financial obligations relevant to the transaction. Appointment data may further include various per diem charges associated with the appointment and the containers. In another non-limiting example, situations where containers and/or other equipment may be held longer than a standard appointment time (free time), user may be charged. After the free time, user may be charged per diem (per day) until the equipment is returned. In some cases, users may be charged per diem on containers and/or equipment that has been returned within the "free time" period or sooner than what charges indicate, may be a predefined duration during which the carrier may hold a container without incurring additional charges, may be referred to as per diem fees For example, a carrier may be ready to return a container but is unable to secure an appointment due to terminal restriction, such as no terminal accepting the empty return, in this case, per diem charges made in error such as above example may be disputed. To address the error charge issue, system 100 may include functionality for tracking the availability of appointment slots at various terminals and provide alerts when slots become available. Furthermore, system may maintain a record of attempts made by the carrier to return the container, documenting all instances when the terminal was unable to accept the return. Documentation may serve as evidence to support the carrier in disputing unjust per diem charges. Additionally, system 100 may feature a dispute resolution module that may automate the process of contesting charges. Upon the entry of a dispute, system 100 may collate all pertinent information, including the container's free time period, recorded attempts to schedule a return appointment, and any communications with the warehouse or terminal regarding delays. The compiled evidence can then be submitted to justify the waiver of the charges. Computing device may be equipped to capture and collect various charges that a user may be incurred in relation to container usage, commonly referred to as per diem charge. Per diem charges in this case may include detention and demurrage. As used in this disclosure, "detention" is fees applied when a container remains at the terminal beyond the free allotted time agreed upon in the shipping contract. Conversely, "demurrage," as used in this disclosure, is charges incurred when a container is held outside of the terminal, such as at a warehouse or other facility, beyond its free time period. For example, screenshot and data scraping may extract detailed information from terminal website. To facilitate the monitoring and management of both charges, computing device may employ methods such as screenshots and data scraping to extract detailed information on such fees from terminal websites. User interface features 156 of system 100 may allow users to view and analyze detention and demurrage from plurality of terminals, even if plurality terminals are dispersed across various geographic locations. Scheduling systems of intermodal terminals may impact the ability of carriers to pick up or return containers within the free time period, may lead to additional charges. Computing device may include the capability to interface with the terminal-specific systems, may engage users to track appointment times and correlate them with the accrual of detention and demurrage. User may view per diem charges from multiple terminals through the user interface. To address the potential disputes that may arise from these charges, system may provide a user-friendly dispute resolution feature. Feature may allow users to contest incorrect or unwarranted detention and demurrage directly through the interface, may provide a streamlined process for resolving financial discrepancies related to container usage. In some cases, one or more intermodal terminals may be present within one or more geographic locations. Intermodal terminals may have their own software and systems utilized for appointment scheduling. In one or more embodiments, Intermodal terminals may operate independently. Each terminal system may be unique to the specific operational requirements and logistics workflows of each location. In another embodiment, computing device may be configured to interface with multiple disparate terminal systems, aggregating appointment data unified within user interface. For example, each terminal will have distinct appointments. System 100 may be designed to operate separate scheduling systems to avoid any confusion for truckers and carriers. In an additional embodiment, user interface may present appointment data in a consolidated view while maintaining segregation between different terminals. User interface may utilize visual cues, tags, or filters to differentiate appointments by respective terminals to ensures that users can easily navigate and manage appointments without the risk of conflating schedules from different locations. In an embodiment, system 100 may provide functionality for users to select a specific terminal and view or manage appointments solely for that terminal in help to prevent any potential confusion that may arise from overlapping or similar appointment structures across terminals under the same ownership. By doing so, truckers may manage their schedules, accessing and interacting with the correct terminal-specific appointment data. In an additional embodiment, system 100 may alert users when scheduling or reviewing appointments for terminals with similar naming conventions or ownership to reduce the potential errors in container pickup or delivery planning. The receipt of appointment data in one central location facilitates the appointment process for carriers, shipping companies and the like. In an embodiment, computing device may be configured to serve a universal appointment system as a centralized platform for aggregating logistics data. As used in this disclosure, a "universal appointment system" is designed to streamline the appointment process by providing carriers, shipping companies, and logistics operators with a singular, comprehensive view of appointments across multiple intermodal terminals. The universal appointment system may aggregate logistics information including, but not limited to, container data, vessel Estimated Times of Arrival (ETAs), transport schedules, appointment times, space availability, and customs holds. By compiling this information into one central location, system 100 may simplify the management of logistics operations. For example, a carrier may use universal appointment system to access a unified dashboard that displays aggregated data from various sources. Unified dashboard may display the available appointment slots across different terminals and may provide information such as vessel arrival schedules, which influence the timing of container pickups and drop-offs. In a non-limiting example, information of a container under a customs hold may be displayed, system may alert the carrier to potential delays.

Still referring to FIG. 1, system 100 containing instructions configuring the at least processor to identify, at a plurality of remote web pages 120 provided at a plurality of third-party sources 116, a plurality of data structures relevant to unified display subject 112. As used in this disclosure, a "remote web pages" is any web page or online content source that is accessible over the internet but is not hosted or directly controlled by the system 100. Remote web pages 120 may be external to a local server 128 or computing environment of system 100 and may be operated by entities other than system owner. Remote web page may vary widely in format, content, and structure, ranging from commercial websites, informational portals, blogs, news sites, to online databases and digital libraries. A common characteristic of remote web pages 120 may include their accessibility via the internet, allowing system 100 to retrieve data from remote web pages 120 for aggregation and synthesis. In a non-limiting example, remote web page may be an online logistics news site. In a non-limiting example, System 100 may be configured to interface with various terminal websites and public data sources to compile essential logistics information. Terminal websites may be a source of real-time data related to container statuses, appointment schedules, and vessel movements. System 100 may employ a web monitoring technology to systematically scan these websites, capturing updates on container availability, slot openings for appointments, and changes in vessel itineraries. Additionally, system 100 may access other public sites that may include transportation authorities for traffic and road conditions, port authorities for operational notices, and customs databases for clearance and hold information. By consolidating public site data, system 100 may provide users an overview of the variables affecting logistics and supply chain operations. As used in this disclosure, a "third-party source" is entities or organizations that own, manage, or provide remote web pages 120 from which system 100 retrieves data. Third-party sources 116 may be independent of the entity operating system 100 and represent a diverse array of online information providers. Third-party sources 116 may include, but are not limited to, commercial companies, government agencies, educational institutions, non-profit organizations, and individual content creators. Third-party sources 116 may be characterized by their ownership or authority over the content presented on their respective dataset, which system 100 accesses for data aggregation purposes. As used in this disclosure, a "data structure" is an organized formats in which information is presented and stored on remote web pages 120. Data structures 124 can vary from simple text blocks and numerical data to more complex arrangements like tables, lists, images, videos, hyperlinks, and embedded metadata. Data structures 124 may be designed to represent and convey information in a coherent and logical manner, enabling both human readability and machine processing. In the case of system 100, data structures 124 may be the fundamental units of content that are identified, extracted, and synthesized to create the updated web page, and data structures 124 may determine the accuracy and relevance of synthesized content. These structures may provide organized and specific information and system 100 can aggregate and synthesize for its web page. In this case, processor 104 may utilize a web crawling module, web crawling module may systematically navigate and scans remote web pages 120 for content relevant to unified display subject 112. Web crawler may be programmed with algorithms capable of parsing HTML, XML, and other web formats to extract structured data. To ensure comprehensive coverage, processor 104 may employ heuristic algorithms to determine the relevance of data on remote web pages 120, based on criteria such as content similarity, metadata analysis, and contextual relevance to unified display subject 112. The system may also use API integrations where available, allowing for more direct and structured data retrieval from third-party sources 116. Further, advanced filtering mechanisms may be applied by processor 104 to refine the collected data. Refine includes removing redundant or irrelevant information and categorizing the data for efficient aggregation.

With continued reference to FIG. 1, in an embodiment, wherein identifying the plurality of data structures 124 may include a set of criteria 132. As used in this disclosure, a "set of criteria" refers to a predefined collection of parameters, rules, or conditions used by processor 104 to determine the relevance and importance of data structures 124 on remote web pages 120. Criteria may encompass a variety of factors, including but not limited to, keyword density, semantic relevance, content freshness, metadata attributes, and source authority. Processor 104 applies set of criteria 132 through algorithmic analysis to efficiently and accurately isolate data structures 124 that are pertinent to unified display subject 112. As a non-limiting example, system 100 may be configured to gather data relevant to global shipping logistics. Set of criteria 132 for identifying pertinent data structures 124 may include keywords such as Marine Terminal Appointment, Terminal Operating System, Terminal Appointment System, customs holds, vessel ETA, Vessel schedule, vessel location, container location, container size, type, etc. Processor 104 may also look for data published within the last six months (ex. content freshness), prioritize sources known for their authority in the logistics field (ex. source authority), and analyze metadata for tags like 'shipping', 'logistics', or 'trade' (metadata attributes). As a nonlimiting example, system 100 may be configured to utilize a classification algorithm, such as a clustering algorithm or k-nearest neighbors (KNN), to gather data relevant to global shipping logistics. Set of criteria 132 for identifying pertinent data structures 124 may incorporate keywords such as cargo, maritime, shipping routes, and logistics trends and also employ classification algorithms to cluster similar data points or identify the 'k' closest data structures within a defined threshold measure of similarity to unified display subject 112. Processor 104 may further refine the search for relevance by considering data freshness, focusing on information published within the last six months. It may also prioritize sources recognized for their authority in the logistics field, and analyze metadata for tags consistent with the display subject, such as 'shipping', 'logistics', or 'trade'. This approach allows system 100 to effectively filter and select data structures that are not only topically relevant but also contextually similar, enhancing the coherence and utility of the synthesized information on the web page. By applying set of criteria 132, processor 104 may filter and select the most relevant and up-to-date information from a web sources, may ensure synthesized web page 152 is both accurate and topical.

Continuing refer to FIG. 1, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of elements of a first type or category with elements of a second type or category, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, computing device may generate a k-means clustering algorithm receiving unclassified data and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related data, which may be provided with user cohort labels; this may, for instance, generate an initial set of user cohort labels from an initial set of data, and may also, upon subsequent iterations, identify new clusters to be provided new labels, to which additional data may be classified, or to which previously used data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids ci of centroids in set C. Unclassified data may be assigned to a cluster based on $\mathrm{argmin}_{c_i \ni C} \, \mathrm{dist}(c_i, x)^2$, where argmin includes argument of the minimum, ci includes a collection of centroids in a set C, and dist includes standard Euclidean distance. K-means clustering module may then recompute centroids by taking mean of all cluster data entries assigned to a centroid's cluster. This may be calculated based on $c_i = 1/|S_i| \Sigma x_i \ni S_i^{xi}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected element. Degree of similarity index value may indicate how close a particular combination of elements is to being classified by k-means algorithm to a particular cluster. K-means clustering algorithm may evaluate the distances of the combination of elements to the k-number of clusters output by k-means clustering algorithm. Short distances between an element of data and a cluster may indicate a higher degree of similarity between the element of data and a particular cluster. Longer distances between an element and a cluster may indicate a lower degree of similarity between an element to be compared and/or clustered and a particular cluster.

With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between an element and the data entry cluster. Alternatively, or additionally k-means clustering algorithm may select a plurality of clusters having low degree of similarity index values to elements to be compared and/or clustered thereto, indicative of greater degrees of similarity. Degree of similarity index values may be compared to a threshold number indicating a minimal degree of relatedness suitable for inclusion of a set of element data in a cluster, where degree of similarity indices a-n falling under the threshold number may be included as indicative of high degrees of relatedness. The above-described illustration of feature learning using k-means clustering is included for illustrative purposes only, and should not be construed as limiting potential implementation of feature learning algorithms; persons skilled in the art, upon reviewing the entirety of this disclosure, will be aware of various additional or alternative feature learning approaches that may be used consistently with this disclosure.

Still referring to FIG. 1, system 100 may be configured to use a language processing module to identify data structures within a threshold measure of similarity to unified display subject. Language processing module may include any hardware and/or software module. Language processing module may be configured to extract, from the one or more documents, one or more words. Language processing module may comprise both hardware and software components designed to perform advanced natural language processing tasks. Language processing module may be configured to extract words and phrases from one or more documents. Language processing module may also utilize a neural network, such as a word embedding model, to generate vectors corresponding to the extracted words and phrases. Vectors may represent the semantic and syntactic characteristics of the language elements, enabling system to process the text in a way that captures the nuances of meaning and context. This vectorization is crucial for tasks such as clustering similar documents, identifying relationships between different terms, and improving the accuracy of information retrieval and classification within system 100. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module may operate to produce a language processing model. Language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted word, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or [computing device] may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into [computing device]. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

Still referring to FIG. 1, to facilitate the integration of unified display subject 112 and data structures 124 into the machine learning processes, system 100 may employ techniques for converting elements into numerical representations that may be processed. For example, to transform unified display subject and each data structure into high-dimensional vectors using a trained neural network. Neural network may analyze the text and metadata of each data structure, extracting features such as keywords, semantic meaning, and contextual relevance, which are then encoded as vectors. The resulting vectors may serve as inputs for algorithms like K-means clustering or language processing techniques, allowing system to assess the similarity between unified display subject and the available data structures. Additionally, system may identify specific fields within data structures that are most indicative of unified display subject. Unified display subject and data structures may then be combined and mapped into clustering algorithm to group similar data structures together. Vectorization and clustering may enable processor 104 to discern patterns and relationships within the data.

With continued reference to FIG. 1, wherein system 100 may further include a web crawler module 164 configured to periodically scan the plurality of remote web pages 120 for updates. A "web crawler," as used herein, is a program that systematically browses the internet for the purpose of Web indexing. The web crawler may be configured to scrape appointment data from one or more websites of the one or more intermodal terminals. Web crawler may be part of a broader set of data reception channels utilized by system 100, showcasing its ability to receive data via various methods. For instance, besides web crawler function, data may also be received through direct API integrations with third-party sources 116, RSS feeds, or manual user inputs. For example, system 100 may use the web crawler module 164 to monitor logistics news websites for the latest updates on global shipping conditions, while also receiving data through API integrations with maritime traffic reporting services. The combined data from these varied channels ensures a comprehensive and up-to-date synthesis of information on web page. Web crawler module 164 may be structured to autonomously navigate the internet, systematically visiting specified remote web pages 120 at predetermined intervals. In some cases, appointment data may be used through API integration, web crawling screen scraping and the like. The configuration of web crawler may involve setting up algorithms that direct its operation, configuration may include defining the frequency of scans, the specific database or domains to be visited, and the criteria for identifying new or altered content since the last scan. Web crawler may be programmed to recognize and log changes in data structures 124, such as updated text, new articles, altered images, or changes in metadata. Comparing the current state of database with cached versions from previous scans may be achieved. Web crawler module 164 may employ differential analysis techniques to identify the changes, minimizing the data that needs to be processed and transferred back to system 100. This approach may ensure system 100 updates synthesized web page 152 with the most current information, while optimizing the use of network and processing resources. As a non-limiting example, system 100 may use web crawler module 164 to monitor a selection of logistics news websites known for providing timely updates on global shipping conditions. Web crawler module 164 may be set to visit these sites every fifteen minutes, every thirty minutes, and/or every hour to ensure the information is updated at least in near real-time. On each visit, it may scan for new articles or updates to existing ones, focusing on changes in text or new data visualizations. If the module detects that a key article on recent changes in maritime regulations has been updated with new compliance guidelines, it may retrieve updated information. System 100 may then process new data to update synthesized web page 152, ensuring that users accessing the page receive the most recent and relevant information available.

Still referring to FIG. 1, system 100 containing instructions configuring the at least processor to determine return data associated with each container of the one or more containers as a function of the appointment data. "Return data," for the purposes of this disclosure, encompasses information related to the return of a container. This includes the expected return time before fees start accruing, the anticipated return time based on the container's distance from its destination, and both estimated and actual fees and charges. Elements of return data may be acquired through various means. Elements such as estimated return times and fees, may be calculated by processor 104 based on algorithms that consider factors like distance, historical data, and current logistical conditions. In contrast, other elements like actual fees and charges might be received directly via a Web Crawler scanning intermodal terminal websites. In an embodiment, processor 104 may be configured to program with advanced algorithms that are utilized to estimate return times and potential fees for containers. Estimates may be generated by considering the distance the container must travel, historical patterns of container movements, and the prevailing logistical conditions that might affect transportation and storage. Fees and charges may be determined and applied outside of automated systems. Container owners, primarily ocean carriers, who customarily invoice these charges to their customers, may then pass on the costs to the carriers. System 100 may be enhanced to maintain a historical record of container movements and terminal acceptance patterns. Historical data may enable users to determine when a container terminal has historically been open to accepting empty returns. Carriers and operators may substantiate any disputes related to per diem charges, providing evidence that the inability to return a container was due to terminal constraints rather than carrier actions. Web crawler module 164 may be capable of scanning intermodal terminal websites to gather current data, may be tasked with compiling a historical log. Historical log may record the dates and times when terminals announce for open and returns, which may be cross-referenced against the times when containers may be held by the carrier. Computing device within system 100 may adept at identifying containers that are nearing the end of their free time. As used in this disclosure, "free time" is the window before per diem charges apply. Identification may enable system 100 to proactively inform users of impending fees if a container is held longer than the allocated free time. Additionally, computing device may calculate an estimated return time for each container and generate projected charges based on this timeline. This information is important for logistics planning and cost management. System 100 may also include a user interface feature through which return data is presented to the user. User interface may allow users to receive and review charges provided by the intermodal terminals. Users may be presented with options regarding the return data, return data may include breakdowns of the charges associated with each container, based on the information aggregated by system 100 from various sources, such as terminal websites, ocean carrier databases, and internal records. Interface may provide navigation, allowing users to choose to pay the associated charges for each container or dispute the associated charge. In an embodiment, users may be presented with options as a function of return data. User may choose to directly pay the associated charges for each container, or users may be given the option to dispute any charges they deem incorrect or unjustified. In the event of a dispute, System 100 may assist users by automatically collating relevant data, such as historical terminal acceptance times and documented communication with the terminals. Computing device may be configured to receive and process selections, enabling a seamless interaction between the user and the logistics management system. As a non-limiting example, system 100 may determine a particular container, based on its current location and traffic conditions, may be expected to return to its terminal a day later than scheduled. System may calculate the potential extra charges that may accrue due to this delay and displays this information through the user interface. The user, upon reviewing this data, can decide to either accept and pay the additional fee or dispute it based on their records or circumstances. In a case where the user opts to pay, system 100 facilitates the payment process, interacting with the terminal's billing system to complete the transaction. If the user disputes the charge, system 100 may gather relevant data and documentation to support the dispute and transmit this information to the terminal, all managed through the intuitive user interface.

Still referring to FIG. 1, system 100 may include instructions configuring at least processor to aggregate, at a local server 128, the plurality of data structures. As used in this disclosure, a "local server" is a computing server or a collection of servers that are located on-premises or within the same network infrastructure as system 100. Computing server may distinct from remote servers or cloud-based services in that they are physically and operationally closer to system 100, allowing for more direct and rapid communication and data transfer. The local server 128 typically hosts the necessary software and databases 140 for system 100 and is responsible for centralizing, processing, and managing the data collected from various sources. Its proximity and direct connection to system 100 facilitate efficient data processing and storage, enabling quicker access to and synthesis of information. In some embodiment, wherein aggregating the plurality of data structures may include a sorting module 136 configure to categorize a data base 140. As used in this disclosure, a "sorting module" is a component of system 100, software algorithm or set of algorithms, designed to systematically organize, and classify data. The sorting module 136 works by applying specific criteria and rules to arrange the incoming data structures 124 into meaningful categories or groups. These criteria might be based on content type, source reliability, relevance to unified display subject 112, or other relevant factors. Sorting module may enhance the manageability and accessibility of data, ensuring that related information is grouped together and can be easily retrieved for further processing or display. As used in this disclosure, a "database" is a structured collection of data, typically stored electronically in computer system. Database in system 100 may serve as a centralized repository where the sorted data structures 124 are stored. Database may be designed to manage large volumes of information, allowing for quick data retrieval, updates, and management. Database may be queried and accessed by various components of system 100 to fetch the required data for synthesizing the web page or for other analytical purposes. As a non-limiting example, system 100 may receive a diverse range of data structures 124 from multiple logistics websites, including text articles, tables of shipping schedules, and infographics on global trade routes. Sorting module may categorize these data structures 124 into different sections within the database—articles under logistics news, schedules under shipping timetables, and infographics under trade data visualizations. Categorization may allow local server 128 to efficiently retrieve and aggregate this categorized data when generating synthesized web page 152, ensuring that users can easily navigate and understand the diverse content.

Still referring to FIG. 1, system 100 may be equipped with instructions that enable at least one processor to perform data aggregation tasks at a local server 128. Server may be a computing server or a collection of servers located on-premises or within the same network infrastructure as system 100, different from remote servers or cloud-based services due to its proximity, facilitating more direct and rapid communication and data transfer. Local server 128 may host software and databases 140 for system 100, centralizing, processing, and managing the data collated from various sources. The aggregation process on local server 128 may be multifaceted and may be designed to ensure the integrity and utility of the data structures. Firstly, system may combine data structures from diverse sources into a singular, comprehensive dataset. During the combination process, process may employ specialized algorithms designed to identify and eliminate redundant elements. To create a non-redundant, data structure may accurately represent the collected information. To further refine the aggregated data, system may utilize advanced language processing techniques with vector similarity analysis to detect synonyms and semantic parallels across different data structures. In a non-limiting example, system may leverage a plurality of machine learning models and neural networks. For example, two data structures may provide conflicting details about a container's location, system may prioritize the datum that may be either more recent or aligns with the majority of related data structures. Local server 128 may encompass combination and de-duplication of data structures, redundancy detection with synonym resolution, and contradiction resolution through advanced machine learning techniques.

Still referring to FIG. 1, system 100 containing instructions configuring the at least a processor to generate an intermodal response for each container as a function of the selection. As used in this disclosure, an "intermodal response" is a set of actions determined by the user for each intermodal container based on the data processed by system 100. Response may vary depending on the user's decisions and the container's circumstances. For instance, intermodal response may involve actions to either pay fees associated with a container or dispute these fees. When a user decides to pay, computing device within system 100 can automate the payment process. It may do this by submitting payment directly to the terminals, using the financial information provided by the user. System may be configured to handle the transaction seamlessly and generate a receipt as proof of payment. In cases where a user opts to pay charges, computing device may execute the payment transaction on the relevant intermodal terminal websites. It may use the user's stored financial details to facilitate this transaction and provides a receipt upon successful payment, to ensure a transparent and efficient process. Conversely, if a user decides to dispute charges, computing device may be capable of consolidating supporting documents and transport data necessary for the dispute. Computing device may then transmit this consolidated data to the terminal's website with a single click, streamlining the dispute process. Additionally, system 100 may be configured to automate the per diem charge process entirely. In this case, charges may be automatically disputed or paid based on predefined user preferences or rules set within system, reducing the need for manual intervention. Computing device may also be equipped to aggregate various documents, receipts, invoices, and other relevant information. In situations where intermodal response involves disputing charges, aggregation may ensure all necessary documentation is readily available and can be included in the dispute submission, simplifying the user's task and enhancing the likelihood of a successful dispute. As a non-limiting example, a logistics company using system 100 may receive notification of per diem charges for a container that was returned late. The user, after reviewing the charges and the container's log in the system, decides to dispute the fee. The user selects the dispute option on the interface. System 100 then automatically gathers the container's log, any relevant correspondence, and the terminal's policy, compiling these into a dispute package.

Still referring to FIG. 1, system 100 containing instructions configuring the at least a processor to generate, at local server 128, a synthesized web page 152 from the plurality of data structures. As used in this disclosure, a "synthesized web page" is a webpage that integrates and displays information aggregated from various data structures 124 sourced from multiple remote web pages 120. Synthesis process involves compiling, formatting, and presenting the data in a coherent and user-friendly manner, resulting in a web page that provides a consolidated view of information relevant to a specific unified display subject 112. In some embodiments, synthesized web page 152 may include user-interactive features 156 configured to filter data structures 124. Technically, filter may be achieved by incorporating interactive elements such as dropdown menus, checkboxes, sliders, or search bars into the webpage's design. These elements may be linked to the underlying database and may be programmed to dynamically alter the displayed content based on user inputs. For example, a dropdown menu could allow users to filter data structures 124 by date range, source, or content type. When a user makes a selection, processor 104 processes this input, queries the database accordingly, and updates the web page to display only the data structures 124 that meet the selected criteria. In another embodiment, system 100 may be further configured to perform data pattern recognition on the aggregated data structure to identify elements for synthesized web page 152, wherein synthesized web page 152 further comprises computational data. Performing data pattern recognition may involve using algorithms that analyze aggregated data to identify patterns, trends, or anomalies. Processor 104 may employ machine learning techniques to detect these patterns and extract meaningful insights, which may be then presented on synthesized web page 152. "Computational data," as described in this disclosure, refers to data that has been processed or calculated by system, possibly including statistical analyses, predictive models, or summarized information derived from the raw data structures 124. As a non-limiting example, system 100 may be configured to transmit responses to appropriate websites. For instance, when a user decides to pay or dispute charges through the user interface, system may automatically populate the necessary fields on various terminal websites to facilitate the payment or dispute process. Payment and dispute process may be involved through ERP and email. System may involve entering charge amounts, user details, and payment information on a payment portal or uploading dispute documentation to a terminal's dispute resolution page. Computing device handles these transactions and submissions automatically, streamlining what would typically be a manual and time-consuming process for the user.

With continued reference to FIG. 1, in another embodiment, system 100 may perform data pattern recognition on aggregated data structure utilizing classifiers. Process may be configured to identifying elements for synthesized web page 152, may include computational data derived from the analysis. Classifiers used for data pattern recognition may be designed to analyze the aggregated data to discern patterns, trends, and anomalies. The training data for these classifiers may be sourced from the database maintained by system 100, which may include historical and real-time data gathered from various logistics and shipping sources. data may encompass a wide range of logistics-related metrics, such as container movement patterns, terminal operation efficiencies, and per diem charge occurrences. During training process, a supervised learning approach may be employed, where classifiers may be fed with labeled examples from the dataset. Examples include known outcomes and scenarios, allowing classifiers to learn to identify similar patterns in new data. More data may be collected and fed into system over time, classifiers maybe retrained or updated to adapt to evolving trends and new information in the logistics domain. The outcome of the pattern recognition by classifiers may be then utilized to generate synthesized web page 152. Synthesized web page may display the raw data and the insights and conclusions drawn by classifiers, such as predictive analytics on container traffic and alerts on potential operational anomalies. By leveraging classifiers for data pattern recognition, system 100 may ensure synthesized web page 152 is a dynamic tool for logistics management, offer users a comprehensive overview of the operational landscape, backed by data-driven computational analysis.

Still referring to FIG. 1, system 100 containing instructions configuring the at least a processor to detect, at one remote web page of the plurality of remote web pages 120, a data structure change 144. As used in this disclosure, a "data structure change" refers to any modification, update, or alteration in the content or format of data presented on a web page. The data structure change 144 may include changes in text, updates to images or videos, addition or removal of links, modifications in metadata, or alterations in data presentation formats like tables or graphs. System detection of data structure change 144 ensure synthesized web page 152 remains current and accurate, reflecting the latest information available from the sourced database. In an embodiment, detecting data structure change 144 may further include an alert mechanism 148 configured to notify the user. Detecting data structure may be accomplished by integrating a monitoring system within processor configuration, which continuously or periodically scans the remote web pages 120 for any identified changes. When a change is detected, the alert mechanism 148 may be triggered. This mechanism can utilize various methods to notify the user, such as sending automated emails, push notifications to a mobile app, or displaying alerts on the system's user interface. The alert content typically includes details about the nature of the change and the specific web page where it occurred, providing users with immediate knowledge of updates that may impact their operations or decision-making. In a non-limiting example, system 100 may monitor a port's schedule webpage for changes in vessel arrival times. If the webpage updates with a delayed arrival time for a specific vessel, system 100 detects change in the schedule data structure. Alert mechanism 148 then notifies the logistics manager using system through an email or a dashboard notification. This alert may enable the manager to quickly adjust logistics plans and communicate the change to relevant stakeholders, demonstrating system's ability to keep users informed and responsive to dynamic information in their operational environment.

Still referring to FIG. 1, system 100 containing instructions configuring the at least a processor to receive, from the remote web page, the detected date structure change. Reception is an update mechanism, may ensure synthesized web page 152 to reflect the most current information. As used in this disclosure, an "update mechanism" refers to a systematic process or set of procedures implemented within system 100 that enables the continuous or periodic refreshing of content on synthesized web page 152. Update mechanism may involve detecting changes in data structures on remote web pages 120, receiving these changes, and subsequently modifying synthesized web page 152 to reflect the most current information. Update mechanism is typically automated, relying on software algorithms to scan for and process data updates efficiently. Ensure synthesized web page 152 remains accurate and up-to-date with the latest available information from various third-party sources 116. Upon detection of a change in a data structure on a remote web page, a signal or data packet, containing details of the change, may be transmitted to system 100. Transmission may employ protocols such as HTTP or HTTPS for web-based data transfer, ensuring both reliability and security in the communication process. Once received, system 100 processor analyzes the incoming data to understand the nature and extent of the change. This analysis involves comparing the newly received data with the existing data in system database to ascertain the specific modifications. Post-analysis, processor 104 may update the relevant portion of synthesized web page 152 to reflect these changes, thereby maintaining its accuracy and relevance. As a non-limiting example, system 100 may be monitoring a transportation department's web page for updates on road closures that could affect container trucking routes. When the web page posts a new road closure alert, system web crawler detects this change in the page's data structure, specifically the addition of new text in the alert section. Information may be then transmitted to system 100, where processor 104 receives and updates synthesized web page 152 to include this new road closure information. This update may be immediately visible to logistics managers using system 100, enabling them to proactively reroute trucks to avoid the newly closed road, showcasing system capability to quickly adapt to and communicate pertinent changes in operational environments.

Still referring to FIG. 1, system 100 containing instructions configuring the at least a processor to modify synthesized web page 152 based on detected data structure change 144. Modification process may involve not just the simple updating of content, but also an intelligent reorganization of the web page to ensure that the most relevant and recent information is prominently displayed. When a change is detected in the data structure of a remote web page, processor 104 assesses the nature of the update and dynamically alters the layout, content placement, and visual emphasis on synthesized web page 152 to reflect this new information accurately and effectively. In an embodiment, wherein modifying synthesized web page 152 comprises prioritizing an incorporation of updates. Processor 104 may use a set of predefined rules or algorithms to determine the significance and urgency of the detected changes. For instance, updates regarding terminal operations, such as changes in container acceptance policies or availability, are immediately brought to the forefront of the display. A practical application of system 100 is the ability to provide real-time visibility into which intermodal terminals are accepting which empty containers, along with any related restrictions. This functionality is crucial in logistics management to prevent shutouts and dry runs, thereby optimizing driver routes and ensuring efficient container movement. System may also maintain historic logs of these terminal policies and container movements, which may be instrumental in disputing any unjust charges incurred by logistics operators. In a non-limiting example, system 100 may include a feature that allows users to comprehensively track and manage various aspects of container logistic, such as container availability, status, holds, and the last free day etc. System 100 may be configured to provide users with real-time access to critical information such as container availability, current status, any holds or restrictions placed on the containers, and notably, the 'last free day' for each container. The "last free day," as used in this this disclosure, is particularly significant as it alerts users to the deadline for moving a container before incurring additional fees, may aid in preventing demurrage or detention. Tracking capability may be integrated to aids users in planning and scheduling, prioritizing critical shipments, and providing timely updates to customers. When there's a change in container status or availability, the system automatically updates information on synthesized web page 152, ensuring that users have access to the latest data for making informed logistical decisions.

Still referring to FIG. 1, system 100 containing instructions configuring the at least a processor to display modified synthesized web page 152 at a remote device 168. As used in this disclosure, a "remote device" is any electronic device capable of accessing and displaying web content provided by system 100. The remote device 168 includes a wide range of devices such as desktop computers, laptops, tablets, smartphones, and even smart displays. Each remote device 168 possesses its own unique set of characteristics, such as screen size, resolution, operating system, and internet connectivity capabilities, which are considered by system 100 in the presentation of synthesized web page 152. In an embodiment, wherein displaying the modified synthesize web page is configured to optimize as a function of remote device 168, wherein remote device 168 further comprises a plurality of devices. System 100 may dynamically adjust the layout, format, and content of the web page based on the specific attributes of remote device 168 being used to view it. For instance, on a smartphone, web page may present a more streamlined, mobile-friendly layout, whereas, on a desktop, it may offer a more expansive view with additional interactive elements. This optimization ensures that regardless of the device, users receive an accessible, user-friendly, and efficient browsing experience. In another embodiment, wherein the system further comprises a feedback module 160 configured to display on synthesized web page 152. The feedback module 160 may serve as an interactive element on the web page that allows users to provide their feedback, comments, or queries directly through the interface. The feedback can be related to the content, the functionality of the web page, or any specific data presented. Feedback module 160 may enable real-time user engagement and provides valuable insights to the system administrators for continual improvement of the system. In an additional embodiment, the "vessel schedules" may be incorporated into the system. The vessel schedules are a prime example of the type of content that could be optimized for display on various remote device 168. With vessel schedules and estimated time arrival (ETAs), system 100 may enhance supply chain visibility by providing up-to-date maritime transport information. System may also maintain change logs for these schedules, which may be essential for communication and planning within the logistics network. When displayed on synthesized web page 152, this feature would be adapted to the viewing remote device 168, ensuring clarity and ease of access whether on a small smartphone screen or a large desktop monitor. Adaptability may enhance the user experience, making critical logistical data readily available to stakeholders in the supply chain network, regardless of their device of choice.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory 108. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 2:
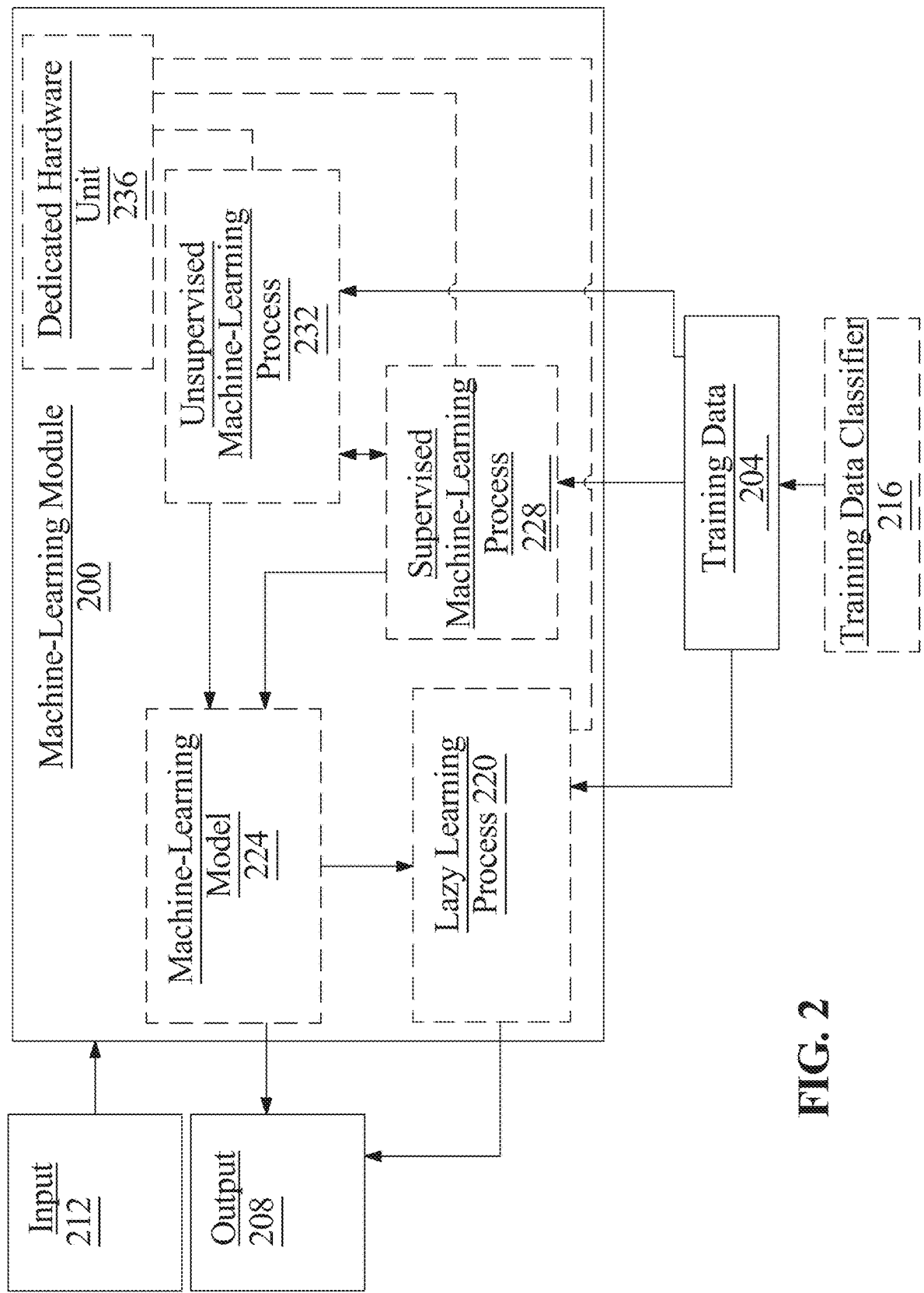
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example input data may encompass a timestamped log of container movements, including arrivals and departures at ports; records of per diem charges incurred over time for a set of containers; user-submitted disputes and the corresponding resolution details; and appointment schedules for picking up or returning containers at different intermodal terminals. Output data may aim to generate predictive analytics on potential per diem charges, recommendations for optimal appointment times to minimize fees, automated dispute suggestions for erroneous charges, and real-time alerts for container status changes that might lead to per diem charges.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a process whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to pinpoint a sub-population of containers that are more susceptible to incurring per diem charges due to factors such as optimal appointment times, routes, terminals, longer dwell times, specific cargo types, or frequent routing through congested terminals, etc. Classification may be based on a comprehensive analysis of historical data patterns, such as the frequency of delays specific to certain shipping lines or terminals, seasonal peaks in cargo traffic, and historical success rates of dispute resolutions.

Still referring to FIG. 2, computing device 204 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 204 may then calculate a likelihood table by calculating probabilities of different data entries and classification labels. Computing device 204 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 2, computing device 204 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 2, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 2, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, santization may include utilizing algorithms for identifying duplicate entries or spell-check algorithms.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Antialiasing and/or anti-imaging filters, and/or low-pass filters, may be used to clean up side-effects of compression.

Further referring to FIG. 2, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 2, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the 25$^{th}$ percentile value and the 50$^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 2, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, Kalman filtering for location data or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include input as described above as inputs (e.g., Optimized routing, optimized appointment booking, historic or future trends, ect.), output as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like. A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
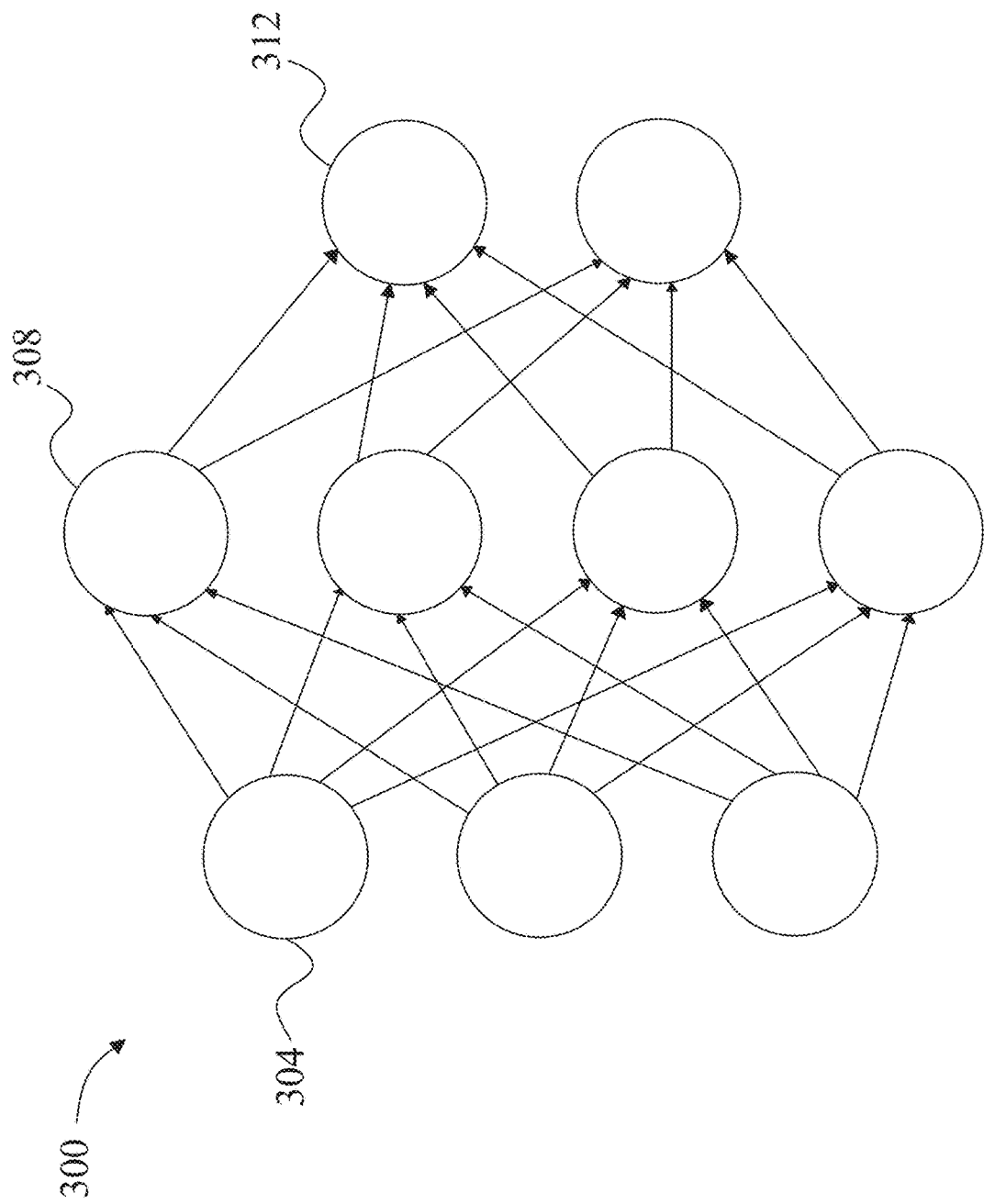
FIG. 3 is a diagram of an exemplary embodiment of neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
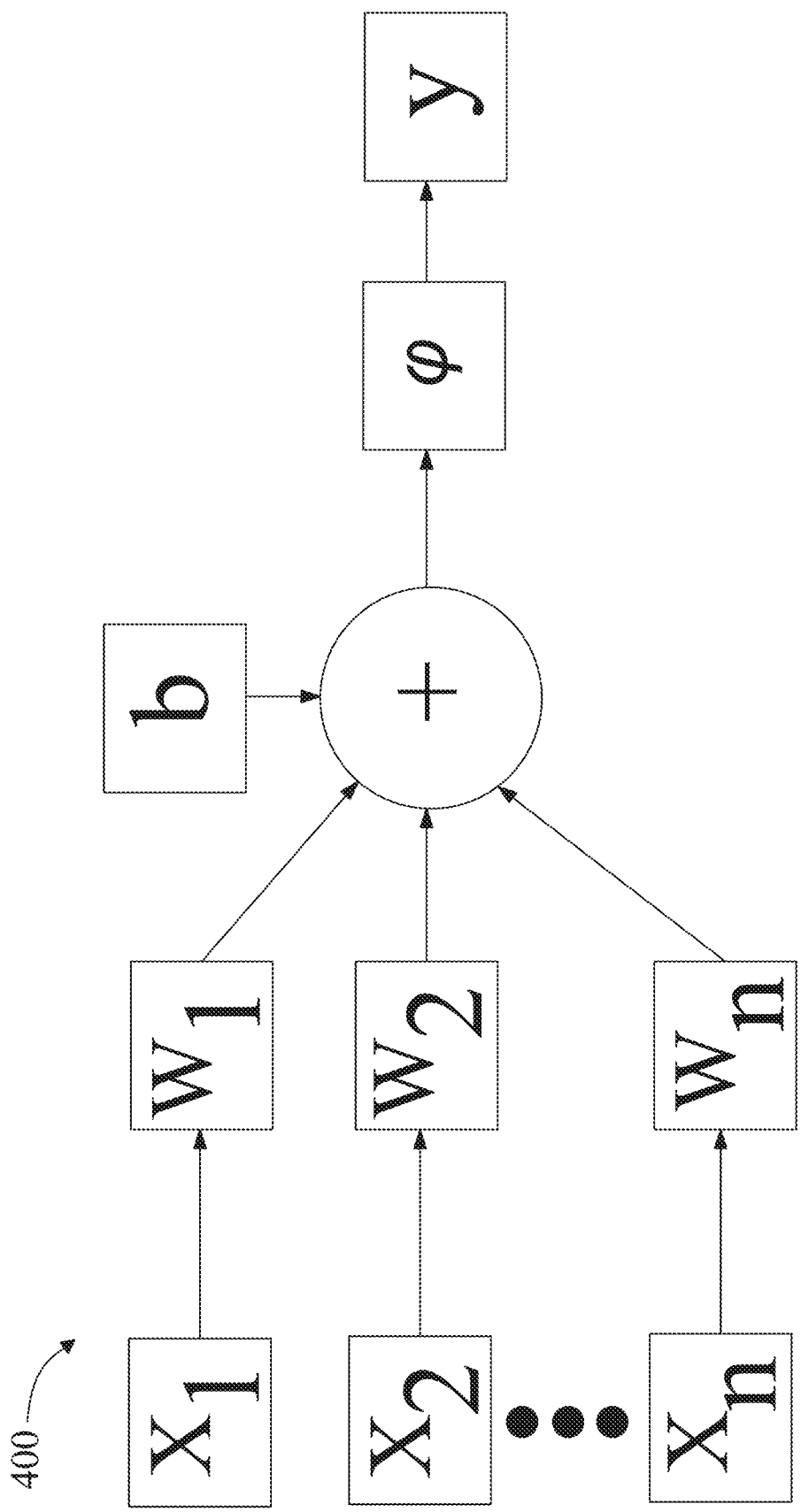
FIG. 4 is a diagram of an exemplary embodiment of a node of a neural network.

Referring now to FIG. 4, an exemplary embodiment of a node ^00 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Referring now to FIG. 5A, an exemplary embodiment of a user interface for displaying load information is illustrated. Load information may be manually input by a user. Load information may be populated via data scraping by apparatus 100 using a web crawler, API integration, and any other data gathering method as described throughout this disclosure. User interface may include a "Load Type" section with options for "Import", "Export", "Road", or "Bill Only", which may enable users to categorize the load according to logistical requirements. Adjacent to this, the "Customer" dropdown menu may allow for the selection of a customer from a pre-populated list, ensure the user inputs may be consistent and accurate. The "Port" and "Consignee" fields follow, where users may specify the origin or destination port and the consignee of the load, respectively. These dropdown menus may further streamline the data entry process by minimizing the need for manual text entry, reducing the likelihood of errors. User interface may further include "Terminal" section, which provides users with a selection of terminals, may integrate with terminal databases to offer real-time selection options. Accompanying this is a suite of essential logistical details users may input or view. For example, "Vessel ETA" (Estimated Time of Arrival) and "Last Free Day" may help users plan for the arrival and storage of the load, "Outgate Date" and "Ingate Date" may track the movement of the load in and out of terminal gates, "Container Number" field may ensure accurate tracking and identification of each container. Further details may include "Container Size", "Container Type", and "Container Owner", for logistical handling and planning. The "Master Bill of Lading" field and associated "Seal #" may be for shipping documentation and security. User interface may address the need for managing various holds that can be placed on a load, such as "Custom Hold", "Freight Hold", and "Broker Hold", which could affect the flow and release of the load. Significantly, the interface notes that "Automatically Pulls 13 New Data Fields", may indicate system capability to update and retrieve data points to ensure comprehensive load management. Lastly, user interface may provide options for selecting the route for the load, with choices such as "Pick and Run", "Drop and Hook", "Prepull+Drop and Hook", and "Prepull and Live Unload", may offer users a set of predefined routing options that cater to different transportation and delivery strategies.

Figure 5B:
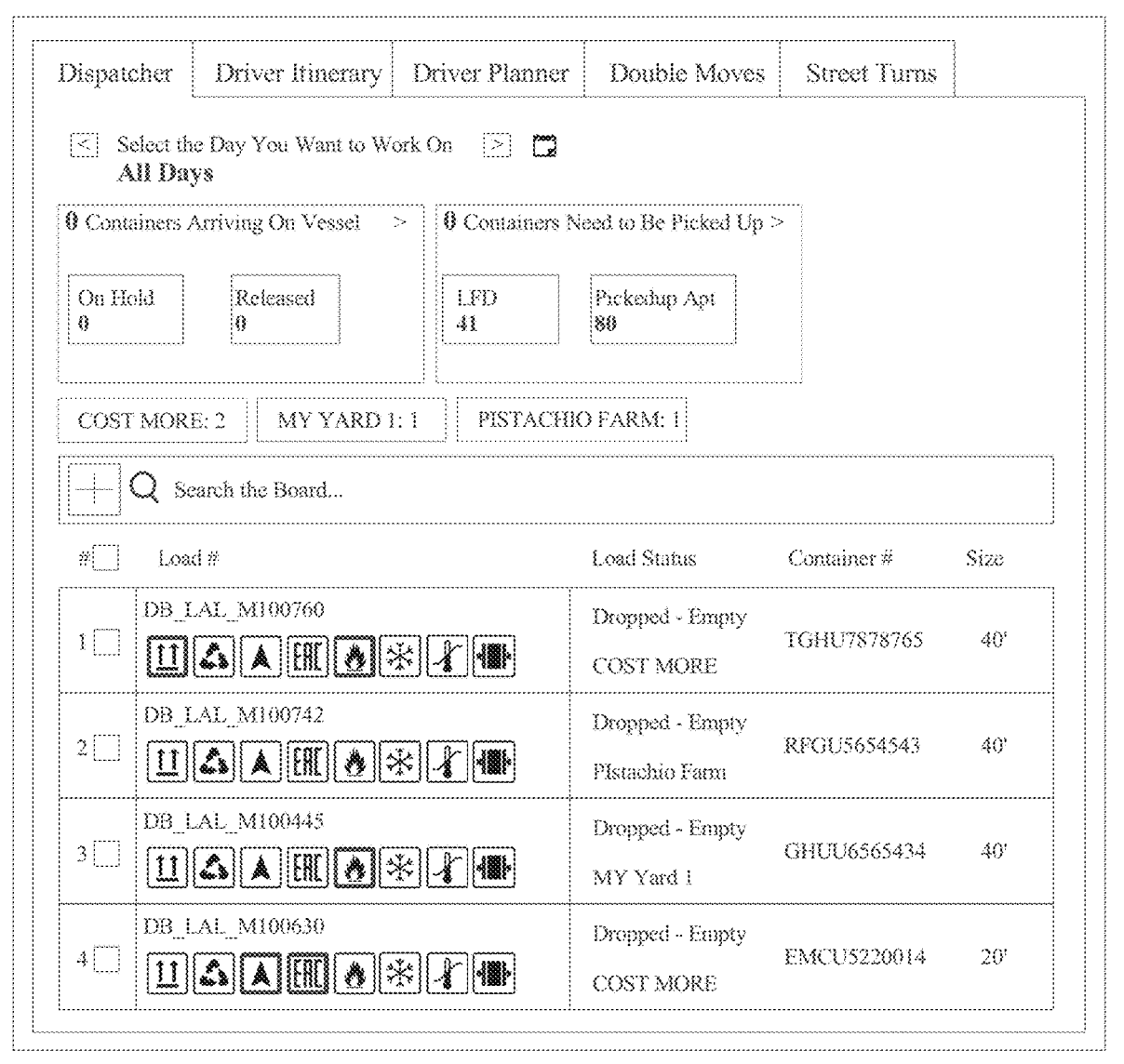

Referring now to FIG. 5B, an exemplary embodiment of a user interface for is a representation of a user interface for dispatcher information with customer information is illustrated. User interface may be designed to provide dispatchers with an overview of container logistics, may include a range of functionalities that streamline the management of container movements and dispatch operations. User interface may include a date selection feature, "Select The Day You Want to Work On," may allow the dispatcher to filter the displayed information based on a specific day's operations. This feature, along with the "All Days" option, provides flexibility in monitoring daily logistics or planning across a broader timeline. User interface may include metrics such as the number of "Containers Arriving On Vessel" and "Containers Need To Be Picked Up," insights may be directly applied into the day's workload and priorities. Additionally, quick status indicators such as "On Hold" and "Released" may offer an at-a-glance understanding of container statuses for real-time decision-making. Below these metrics, user interface may feature a summary section with different tags, for example, "COST MORE: 2", "MY YARD 1: 1", and "PISTACHIO FARM: 1", tags may represent custom tags or filters applied to quickly access containers associated with specific cost issues, locations, or clients. The main panel of user interface 5B presents a list of loads, each entry accompanied by essential details such as "Load #", "Load Status", "Container #", and "Size". The "Load Status" column may use color-coded tags like "Dropped—Empty" and "Loaded" to visually communicate the status of each container, while additional icons may represent actions or alerts related to cost or special handling. For instance, the first line item, with Load #"DB.LAL.M100760" may indicate the container is "Dropped—Empty" and suggests it may "COST MORE" to manage. Furthermore, user interface 5B may include an interactive search feature, allowing dispatchers to locate specific loads or containers within system using keywords or identifiers, enhancing operational efficiency. The design of user interface 5B represents the needs of logistics operations, combining real-time data visibility with user-friendly navigation and actionable insights. System 100, in this embodiment, may be configured to regularly update the user interface 5B to ensure dispatchers have access to the latest information for optimal container management and dispatch planning.

Figure 5C:
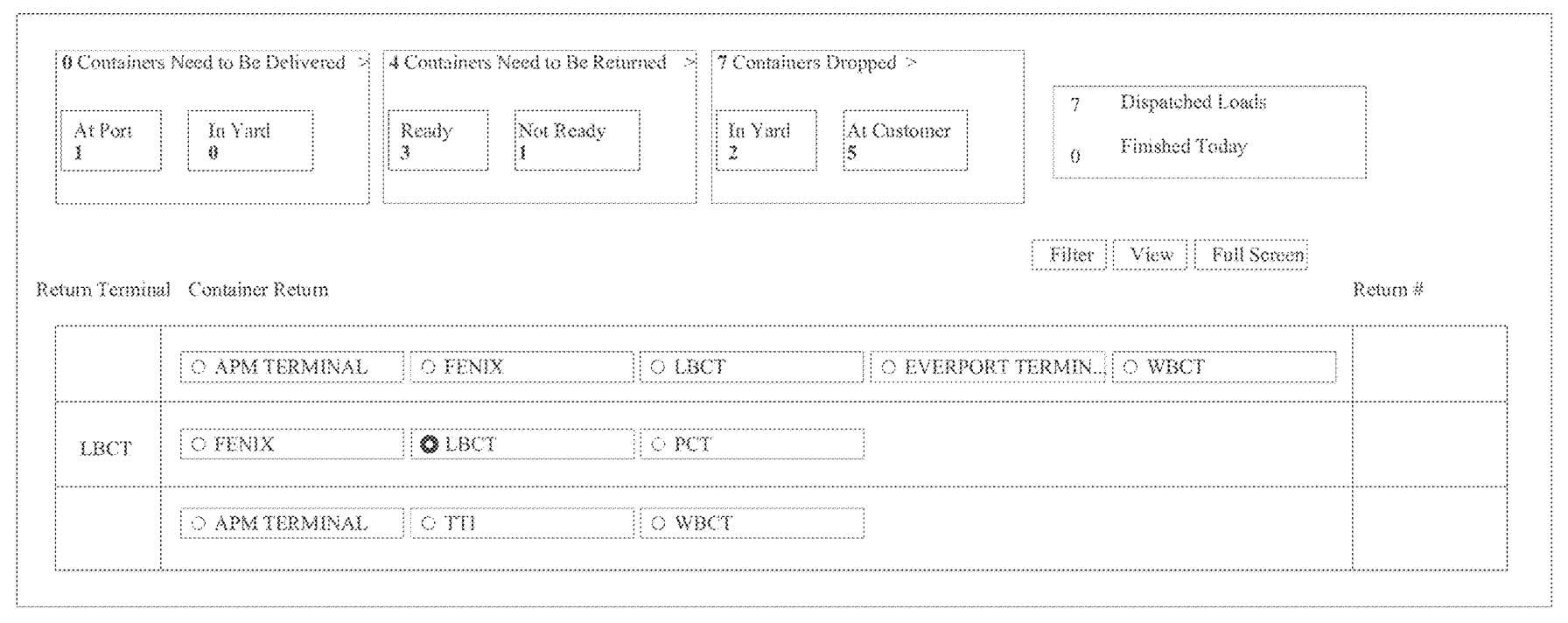

Referring now to FIG. 5C, an exemplary embodiment of a user interface 5C for dispatcher information is illustrated, complementing the preceding FIG. 5B interface. User interface 5C may provide dispatchers with a container logistics operation, displaying information for managing container delivery and returns. User interface 5C may be also segmented into multiple sections, each dedicated to a specific aspect of the dispatch process. The first section, titled "Containers Need To Be Delivered," may present a count of containers at the port and in the yard, provide dispatchers with immediate visibility into pending deliveries. Next, the "Containers Need To Be Returned" section may inform dispatchers of the number of containers that are ready or not ready to be returned, to facilitate an effective turnaround management. User interface 5C may also include the "Containers Dropped" and "Dispatched Loads" sections, may offer a snapshot of containers currently in the yard, at the customer's location, and those that may have been successfully dispatched and finished for the day. These sections may serve as a quick reference to gauge daily progress and outstanding tasks. Below summary panels, user interface may feature a dynamic "Return Terminal" section, where dispatchers can manage the logistics of container returns. Section may include interactive elements such as toggles and switches corresponding to different terminals, for example, APM TERMINAL, FENIX, LBCT, TTl, WBCT, allowing for quick adjustments to the return assignments based on real-time operational needs. The terminal toggles may be a "Container Return" status tracker, visually indicates the status of container returns, enhance the dispatcher's ability to prioritize and address delays or issues promptly. System 100, represented through user interface 5C, may ensure all data regarding container movements, deliveries, and returns are updated iteratively. Constant refresh of information may allow dispatchers to make decisions, optimize container flow, and respond to changes in logistics.

Referring now to FIG. 5D, an exemplary embodiment of a user interface 5D for a per diem audit report is illustrated. User interface 5D may facilitate logistics personnel in monitoring and auditing free days associated with container usage. User interface 5D may be organized into columns displaying essential information such as the "Customer", "Owner", "Type", and "Size" of containers, aligning with the logistics company's requirement to manage various customer accounts and container specifications. User interface 5D may further include a feature allowing users to "Select Customer", which can streamline the display to show information for a particular customer, here exemplified as "MSC". User interface may further include a detailed breakdown of the free days allocated to container usage. It may articulate different tiers such as "Tier #0" and "Tier #1" with corresponding free day ranges and associated fees, allowing users to discern the financial implications of container utilization over time. Moreover, it features a "Tier #2" for long-term use, where the fees may escalate significantly after a specified period. An additional column titled "Holiday" may indicate whether holidays are considered in the calculation of free days, which is a crucial factor in avoiding inadvertent charges. Alongside, the "First Weekend" column may specify whether weekends are counted as free days, a detail that can significantly impact per diem calculations. Each row may include an interactive section where users can adjust the "Day" count, instantly updating the system with the new free day allowance for each container. Feature may be complemented by a "Save" button, symbolized by a disk icon, allow users to instantly apply and record any changes made to the per diem allowances.

Figure 6:
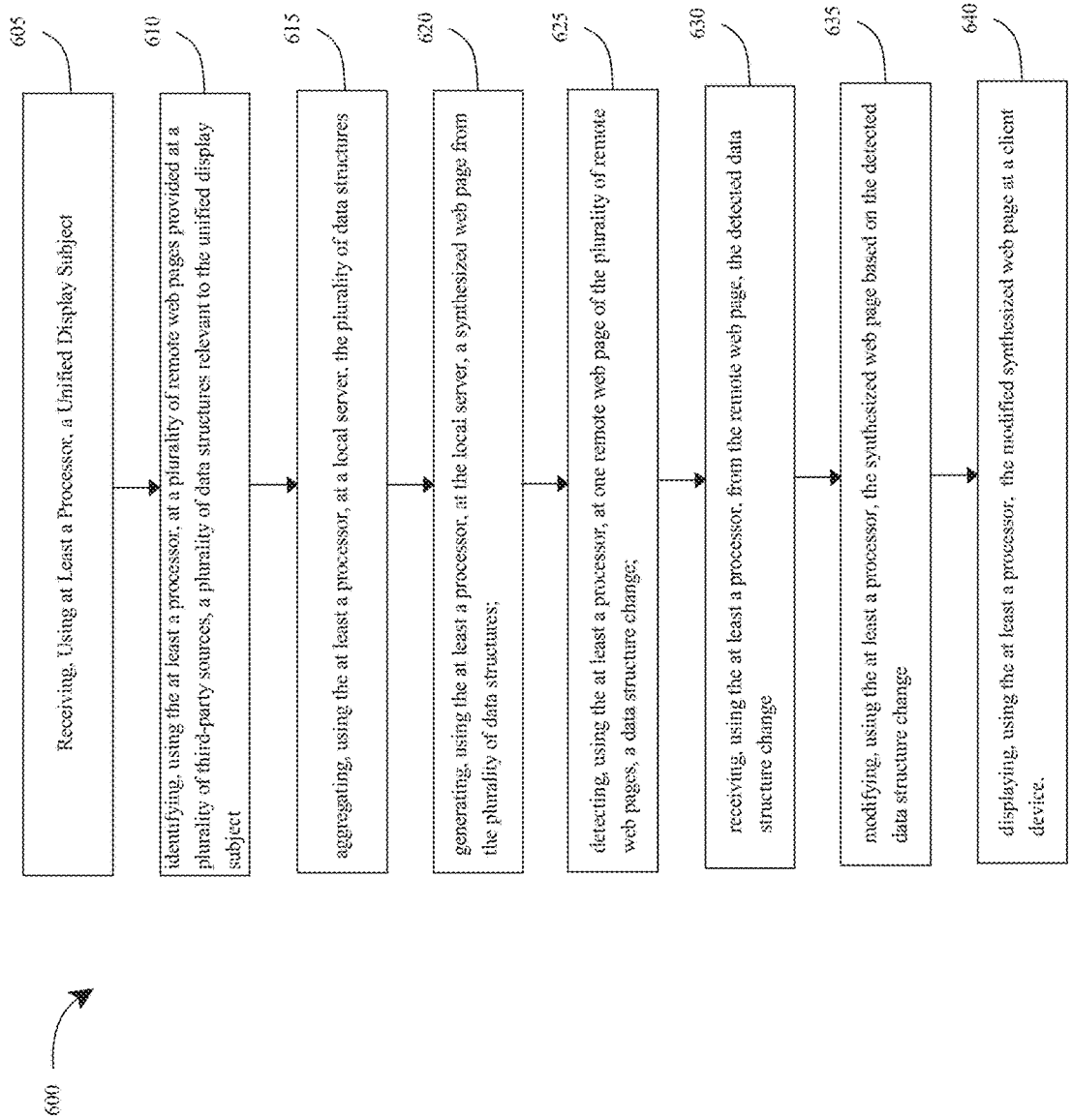
FIG. 6 is a flow diagram illustrating an exemplary work flow in one embodiment of the present invention.

Referring now to FIG. 6, a flow diagram of an exemplary method 500 for generating a synthesized database is illustrated. Method 600 includes step 605 of receiving, using at least a processor, a unified display subject. This may be implemented, without limitation, as described above with referent 1-5.

With continued reference to FIG. 6, method 600 includes a step 610 of identifying, using the at least a processor, at a plurality of remote web pages provided at a plurality of third-party sources, a plurality of data structures relevant to the unified display subject. This may be implemented, without limitation, as described above with reference to FIGS. 1-5.

With continued reference to FIG. 6, method 600 includes a step 615 of aggregating, using the at least a processor, at a local server, the plurality of data structures. This may be implemented, without limitation, as described above with reference to FIGS. 1-5.

With continued reference to FIG. 6, method 600 includes a step 620 of generating, using the at least a processor, at the local server, a synthesized web page from the plurality of data structures. This may be implemented, without limitation, as described above with reference to FIGS. 1-5.

With continued reference to FIG. 6, method 600 includes a step 625 of detecting, using the at least a processor, at one remote web page of the plurality of remote web pages, a data structure change. This may be implemented, without limitation, as described above with reference to FIGS. 1-5.

With continued reference to FIG. 6, method 600 includes a step 630 of receiving, using the at least a processor, from the remote web page, the detected data structure change. This may be implemented, without limitation, as described above with reference to FIGS. 1-5.

With continued reference to FIG. 6, method 600 includes a step 635 of modifying, using the at least a processor, the synthesized web page based on the detected data structure change. This may be implemented, without limitation, as described above with reference to FIGS. 1-5.

With continued reference to FIG. 6, method 600 includes a step 640 of displaying, using the at least a processor, the modified synthesized web page at a remote device. This may be implemented, without limitation, as described above with reference to FIGS. 1-5.

Figure 7:
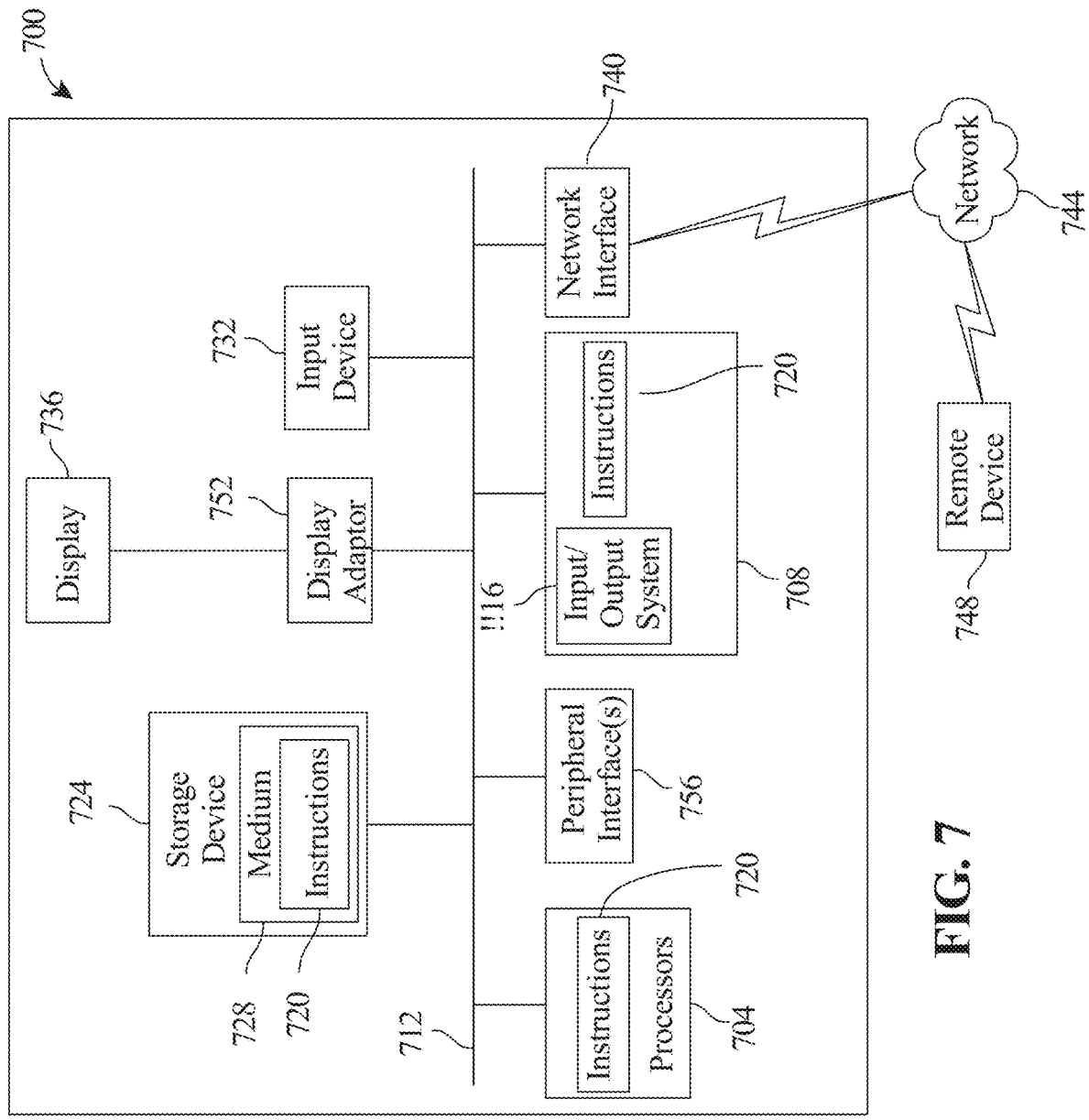
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for generating a synthesized database, wherein the system comprises:
   at least a processor; and
   a memory communicatively connected to the at least a processor, wherein the memory containing instruction configuring the at least a processor to:
   receive a unified display subject;
   identify, at a plurality of remote web pages provided at a plurality of third-party sources, a plurality of data structures relevant to the unified display subject;
   aggregate the plurality of data structures;
   generate a synthesized database from the plurality of data structures;
   detect, at one remote web page of the plurality of remote web pages, a data structure change;
   receive, from the remote web page, the detected data structure change;
   modify the synthesized database based on the detected data structure change; and
   display the modified synthesized database at a remote device, wherein the remote device is in communication with the processor.

2. The system of claim 1, wherein identifying the plurality of data structures further comprises comparing the plurality of data structures to the unified display subject using a classification algorithm.

3. The system of claim 1, wherein the system further comprises a web crawler module is configured to periodically scan the plurality of remote web pages for updates.

4. The system of claim 1, wherein aggregating the plurality of data structures comprises a sorting module configured to categorize a data base.

5. The system of claim 4, wherein the synthesized web page comprises a user-interactive features configured to filter the data structures.

6. The system of claim 1, wherein detecting a data structure change further comprises an alert mechanism configured to notify user.

7. The system of claim 1, wherein modifying the synthesized web page comprises prioritizing an incorporation of updates.

8. The system of claim 1, wherein displaying the modified synthesize web page is configured to optimize as a function of the remote device, wherein the remote device further comprises a plurality of devices.

9. The system of claim 1, wherein the system is further configured to perform a data pattern recognition on the aggregated data structure to identify the synthesized web page, wherein the synthesized web page further comprises a computation data.

10. The system of claim 1, wherein the system further comprises a feedback module configured to display on the synthesized web page.

11. A method for generating a synthesized database, wherein the method comprises:
  receiving, using at least a processor, a unified display subject;
  identifying, using the at least a processor, at a plurality of remote web pages provided at a plurality of third-party sources, a plurality of data structures relevant to the unified display subject;
  aggregating, using the at least a processor, the plurality of data structures;
  generating, using the at least a processor, a synthesized database from the plurality of data structures;
  detecting, using the at least a processor, at one remote web page of the plurality of remote web pages, a data structure change;
  receiving, using the at least a processor, from the remote web page, the detected data structure change;
  modifying, using the at least a processor, the synthesized web page based on the detected data structure change; and
  displaying, using the at least a processor, the modified synthesized database at a remote device, wherein the remote device is in communication with the processor.

12. The method of claim 11, wherein identifying the plurality of data structures comprises a set of criteria.

13. The method of claim 11, further comprising scanning periodically, using the web crawler module, the plurality of remote of web pages for updates.

14. The method of claim 11, wherein aggregating the plurality of data structures comprises a sorting module configured to categorize a data base.

15. The method of claim 14, wherein the synthesized web page comprises a user-interactive features configured to filter the data structures.

16. The method of claim 11, wherein detecting a data structure change further comprises an alert mechanism configured to notify user.

17. The method of claim 11, wherein modifying the synthesized web page comprises prioritizing an incorporation of updates.

18. The method of claim 11, wherein displaying the modified synthesize web page is further configured to optimize as a function of the remote device, wherein the remote device further comprises a plurality of devices.

19. The method of claim 11, further comprising performing, using the at least a processor, a data pattern recognition on the aggregated data structure to identify the synthesized web page which comprises a computation data.

20. The method of claim 11, further comprising displaying, using a feedback module, on the synthesized web page.

* * * * *